United States Patent
Peng et al.

(10) Patent No.: US 7,974,075 B2
(45) Date of Patent: Jul. 5, 2011

(54) ELECTRODE OF SUPERCAPACITOR AND METHOD FOR MANUFACTURING THE SAME

(75) Inventors: Chao-Chun Peng, Hsinchu (TW); Haw-Jer Chang, Hsinchuang (TW); Wen-Ting Lin, Caotun Township, Nantou County (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 285 days.

(21) Appl. No.: 12/334,737

(22) Filed: Dec. 15, 2008

(65) Prior Publication Data

US 2009/0166577 A1 Jul. 2, 2009

(30) Foreign Application Priority Data

Dec. 31, 2007 (TW) .............................. 96151466 A

(51) Int. Cl.
  *H01G 9/00* (2006.01)
(52) U.S. Cl. ........ 361/502; 361/503; 361/504; 361/508; 361/512; 361/519
(58) Field of Classification Search .................. 361/502, 361/503–504, 508–512, 523–529, 516–519, 361/303–305
  See application file for complete search history.

(56) References Cited

U.S. PATENT DOCUMENTS

| | | | |
|---|---|---|---|
| 4,737,889 A * | 4/1988 | Nishino et al. ................ | 361/502 |
| 4,856,179 A | 8/1989 | Goldberg et al. | |
| 6,212,061 B1 * | 4/2001 | Irwin et al. .................... | 361/502 |
| 6,503,856 B1 | 1/2003 | Broadway et al. | |
| 7,407,520 B2 * | 8/2008 | Farahmandi et al. ........ | 29/25.03 |
| 2005/0228110 A1 | 10/2005 | Ko et al. | |
| 2006/0098389 A1 | 5/2006 | Liu et al. | |

FOREIGN PATENT DOCUMENTS

| | | |
|---|---|---|
| CN | 1354292 | 6/2002 |
| CN | 101290835 | 10/2008 |
| FR | 2759087 | 8/1998 |
| GB | 1213387 | 11/1970 |

OTHER PUBLICATIONS

English language translation of abstract of FR 2759087.
English language translation of abstract of CN 1354292 (published Jun. 19, 2002).
English language translation of abstract (on p. 3) of CN 101290835 (published Oct. 22, 2008).

* cited by examiner

*Primary Examiner* — Nguyen T Ha
(74) *Attorney, Agent, or Firm* — Thomas, Kayden, Horstemeyer & Risley, LLP

(57) ABSTRACT

A method for manufacturing an electrode of a supercapacitor is provided. First, a poly(acrylonitrile) (PAN) fabric is provided. The PAN fabric includes a plurality of PAN fibers each having a diameter of about 50-500 nm. Then, the PAN fabric undergoes a heat treatment so that the PAN fibers are carbonized to form a carbon fiber textile. The carbon fiber fabric includes a plurality of carbon fibers each having a diameter of about 50-500 nm. The surface of each carbon fiber is nanoporous having a plurality of nano pores of about 1-50 nm in diameter. The total surface area of the nano pores account for about 85-95% of the total surface area of the carbon fibers. The carbon fiber fabric is then cut to acquire the electrode of the supercapacitor.

8 Claims, 2 Drawing Sheets

ELECTRODE OF SUPERCAPACITOR AND METHOD FOR MANUFACTURING THE SAME

RELATED APPLICATIONS

This application claims priority to Taiwan Application Serial Number 96151466, filed Dec. 31, 2007, which is herein incorporated by reference.

BACKGROUND

1. Field of Invention

The present invention relates to an electrode and a method for manufacturing the same. More particularly, the present invention relates to an electrode of a supercapacitor and a method for manufacturing the same.

2. Description of Related Art

As the technology advances, there are stringent demands for the performance of all sorts of electronic products such as computers, communication devices, and programmable consumer electronics. In order to improve the performance of these and other electronic products, the capacitors used in the electronic products must have greater capacity and higher stability. Hence, the supercapacitor has been considered as a favorable candidate.

The most common supercapacitor has a pair of electrodes and an electrolyte filled between the pair of electrodes. The capacity of the supercapacitor depends on the characteristics of the electrodes. Thus, in respect of improving the capacity, there is an urgent need to enhance the manufacturing process of the electrode.

SUMMARY

In the embodiments of the present invention, an electrode of a supercapacitor and a method for manufacturing the same are provided.

According to one embodiment of the present invention, a method for manufacturing an electrode of a supercapacitor comprises the following steps. First, a poly(acrylonitrile) (PAN) fabric is provided. The PAN fabric includes a plurality of PAN fibers each having a diameter of about 50-500 nm. Then, the PAN fabric undergoes a heat treatment so that the PAN fibers are carbonized to form a carbon fiber textile. The carbon fiber fabric includes a plurality of carbon fibers each having a diameter of about 50-500 nm. The surface of each carbon fiber is nano-porous having a plurality of nano pores of about 1-50 nm in diameter. The total surface area of the nano pores account for about 85-95% of the total surface area of the carbon fibers. The carbon fiber fabric is then cut to acquire the electrode of the supercapacitor.

According to another embodiment of the present invention, an electrode of a supercapacitor has a plurality of carbon fibers each having a diameter of about 50-500 nm. The surface of each carbon fiber is nano-porous having a plurality of nano pores of about 1-50 nm in diameter. The total surface area of the nano pores account for about 85-95% of the total surface area of the carbon fibers.

The electrode of the supercapacitor of the embodiments of the present invention has excellent specific capacity thereby improving the capacity of the supercapacitor employing the electrode.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
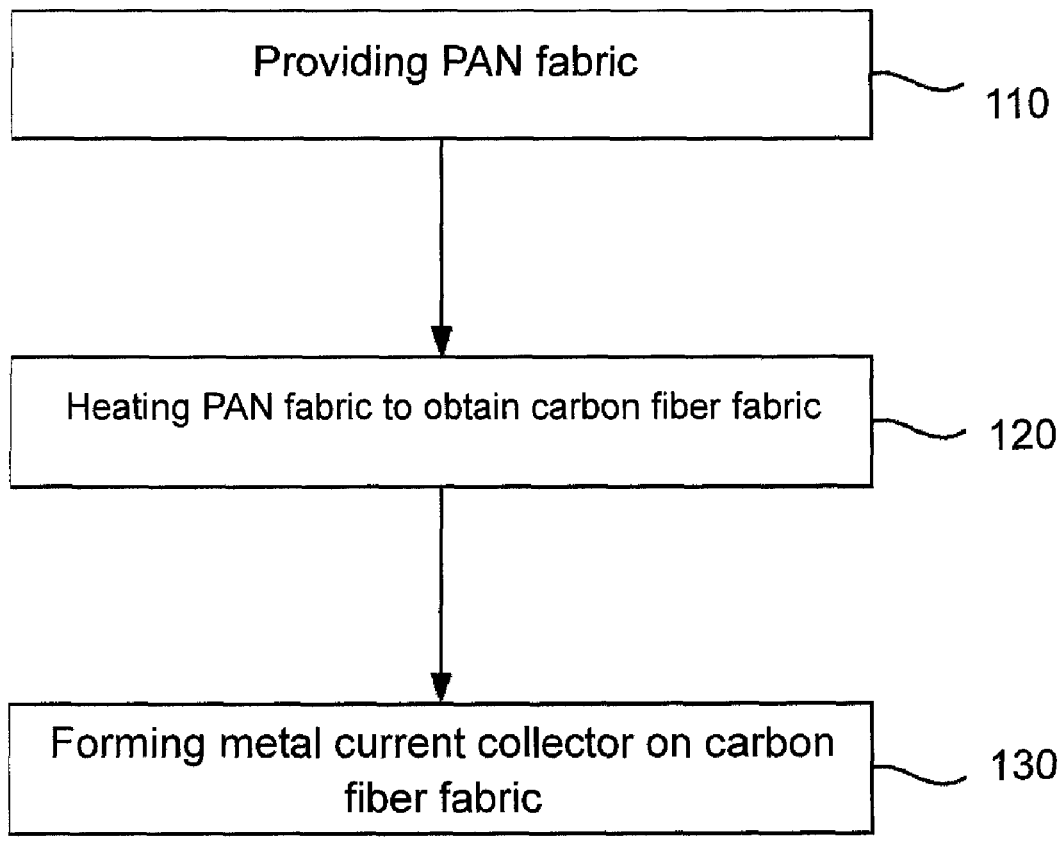
FIG. 1 is a flow chart illustrating a method for manufacturing an electrode of a supercapacitor according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Method for Manufacturing the Electrode of the Supercapacitor

FIG. 1 is a flow chart illustrating a method for manufacturing an electrode of a supercapacitor according to one embodiment of the present invention. First, at step 110, a PAN fabric was provided. The PAN fabric is made from PAN fibers. The PAN fibers each has a diameter of about 50-500 nm. The PAN fiber could be made by electrospinning.

Then, at step 120, the PAN fabric was heat treated to carbonize the PAN fibers to produce carbon fibers thereby obtaining a carbon fiber fabric. The carbon fiber fabric comprises carbon fibers each having a diameter of about 50-500 nm. The surface of the carbon fiber has nano pores of about 1-50 nm in diameter, and a total surface area of the nano pores accounts for 85-95% of a total surface area of the carbon fibers.

Specifically, the step 120 for heat treating the PAN fabric comprises two heating stages. In the first heating stage, the PAN fabric was heated to a first heating temperature of about 200-300° C., and the first heating temperature was maintained for about 60-120 minutes to oxidize the PAN fabric. Afterward, in the second heating stage, the PAN fabric was heated to a second heating temperature of about 800-1000° C., and the second heating temperature was maintained for about 3-9 minutes to form the carbon fiber fabric. In this application, the duration of the time used for maintaining specific heating temperature is also referred as "retention time".

After the carbon fiber fabric has been made, the carbon fiber fabric itself could be cut into electrodes for use in a supercapacitor. Alternatively, at step 130 shown in FIG. 1, a metal current collector could be formed on the carbon fiber fabric so as to obtain an electrode material with lower impedance.

Figure 2:
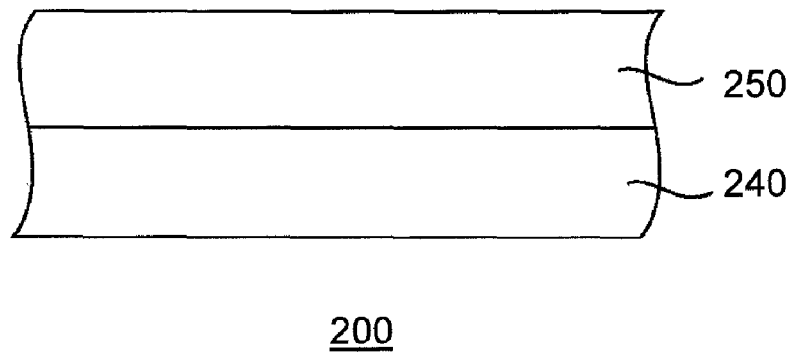
FIG. 2 is a cross-sectional view illustrating an electrode having a carbon fiber fabric and a metal current collector according to one embodiment of the present invention.

FIG. 2 is a cross-sectional view illustrating an electrode having a carbon fiber fabric and a metal current collector according to one embodiment of the present invention. In FIG. 2, the electrode 200 has a carbon fiber fabric 240 and a metal current collector 250. The material of the metal current collector 250 can be platinum, titanium, gold, silver, copper, aluminum, chromium, iron, or an alloy thereof. The metal current collector 250 can be formed by suitable technique known in the related art such as adhering or sputtering techniques. If the metal current collector 250 were formed by the adhering technique, an adhering layer (not shown) would exist between the metal current collector 250 and the carbon fiber fabric 240.

Manufacturing Examples

In examples E1 to E3, the carbon fiber fabrics to be used as the electrode of the supercapacitor were manufactured according to the above-mentioned embodiments. The fibers of the PAN fabric used in these examples have a diameter less than 500 nm. In the first heating stage, the PAN fabric was heated at a rate of about 2° C./minute to about 260° C. (first heating temperature). In the second heating stage, the PAN fabric was further heated to a second heating temperature of about 1000° C., and the retention time of the second heating stage is 3 minutes (in example E1), 6 minutes (in example E2), and 9 minutes (in example E3), respectively.

Analysis of Specific Surface Area

The carbon fiber fabrics of the examples E1-E3 were subjected to absorption experiment to determine the specific surface area of the carbon fiber fabrics. The results are listed in table 1.

TABLE 1

Analysis of Specific Surface Area

|  | E1 | E2 | E3 |
|---|---|---|---|
| Specific surface area (m²/g) | 343 | 494 | 1104 |

In table 1, it could be seen that as the retention time of the second heating stage increases, so did the specific surface area of the carbon fiber fabric. For example, the carbon fiber fabric of example E3 had the greatest specific surface area (1104 m²/g) among the examples shown in table 1. Base on this finding, it's possible to enhance the capacity of the supercapacitor manufactured according to the embodiments of the present invention.

The surface of the carbon fiber fabric of example E3 was further analyzed to demonstrate the pore distribution of the surface. For the carbon fiber fabric of the example E3 (having a specific surface area of 1104 m²/g), the total surface area of bigger pores (those with diameter greater than 50 nm) was about 110.092 m²/g, which accounted for about 10% of the surface area of the carbon fiber fabric of example E3. Thus, the nano pores (those with diameter no greater than 50 nm) responsible for the surface area of carbon fiber fabric of example E3 accounted for about 90% of the surface area.

Analysis of Capacity

The carbon fiber fabrics of examples E1-E3 were further cut into electrodes, and the capacities of the electrodes were determined. The electrodes were disposed in a three-electrode electrochemical system and the capacities were measured by galvanostatic charge and discharge method and cyclic voltammetric method.

In the three-electrode electrochemical system, the reference electrode was a saturated calomel electrode, the working electrode was the electrode of the carbon fiber fabric of example E1-E3, and the counter electrode was a graphite electrode. The electrolyte was 1M sulfuric acid.

Galvanostatic Charge and Discharge Analysis

In galvanostatic charge and discharge analysis, the electrodes of examples E1-E3 were charged at a current of 1 mA and a charge and discharge voltage of 0-0.75 V.

Figure 3:
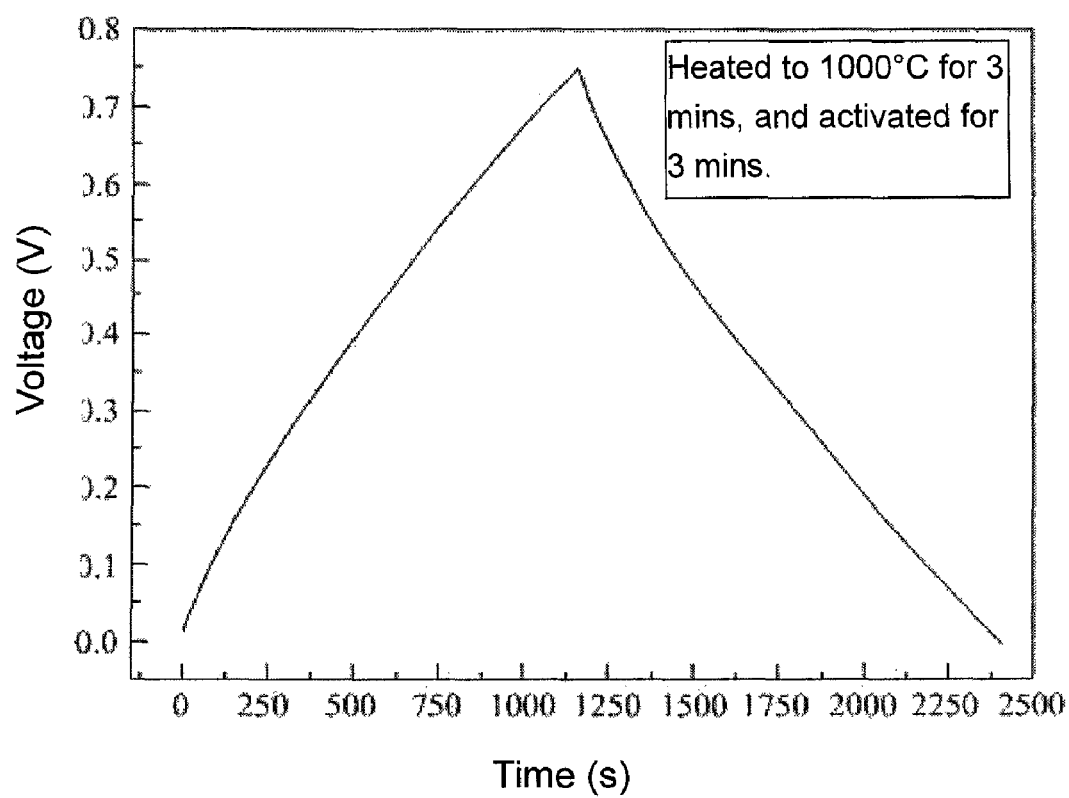
FIG. 3 is a diagram illustrating the results of the galvanostatic charge and discharge analysis of the electrode of one example of the present invention.

FIG. 3 is a diagram illustrating the results of the galvanostatic charge and discharge analysis of the electrode of example E1. From the data shown in FIG. 3, the specific capacity of the electrode was calculated from equation 1:

$$C = \frac{(I \times \Delta T)}{\Delta V \times m} \quad \text{Equation 1}$$

where C is the specific capacity (F/g), I is the current used for charge/discharge, $\Delta T$ is the time elapsed for the discharge cycle, $\Delta V$ is the voltage interval of the discharge, and m is the mass of the active electrode.

The specific capacities of the electrodes made from the carbon fiber fabrics of examples E1-E3 were calculated from equation 1. Each fabric of examples E1-E3 was cut into three electrodes and each electrode was analyzed individually. The result shown in table 2 is the mean value of the three repetitions.

TABLE 2

Galvanostatic Charge and Discharge Analysis

|  | Electrode Mass (mg) | Charge Specific Capacity (F/g) | Discharge Specific Capacity (F/g) |
|---|---|---|---|
| E1-1 | 9.7 | 161 | 168 |
| E1-2 | 9.7 | 174 | 183 |
| E1-3 | 13.1 | 188 | 209 |
| E1 (mean) |  | 174 | 187 |
| E2-1 | 12.1 | 222 | 242 |
| E2-2 | 5.5 | 256 | 296 |
| E2-3 | 7.5 | 266 | 291 |
| E2 (mean) |  | 248 | 276 |
| E3-1 | 7.5 | 267 | 288 |
| E3-2 | 6.8 | 292 | 314 |
| E3-3 | 5.9 | 264 | 292 |
| E3 (mean) |  | 274 | 298 |
| Commercial active carbon fiber 1* |  | — | 110 |
| Commercial active carbon fiber 2* |  | — | 130 |

*Commercial active carbon fiber 1 was acquired from Taiwan Carbon Technology Co., Ltd., Taiwan; Commercial active carbon fiber 2 was acquired from Challenge Carbon CO., Ltd., Taiwan.

As can be seen in table 2, electrodes made from the fiber fabrics of examples E1-E3 had a mean charge specific capacities of about 174-274 F/g and a mean discharge specific capacities of about 187-298 F/g. As compared with the commercially available electrodes, the discharge specific capacities of which were about 110-130 F/g, the electrodes made from the carbon fiber fabrics of examples E1-E3 had much higher specific capacity. Specifically, the specific capacity of the electrode according to examples of the present invention increases by 70-170 percents. Hence, the supercapacitor manufactured from the electrode of the examples of the present invention could have higher capacity.

Cyclic Voltammetric Analysis

Cyclic voltammetric analysis was performed to confirm the capacity of the electrodes of examples E1-E3. The scanning rate of cyclic voltammetric analysis was 6 mV/s and the voltage was 0-0.75 V.

The specific capacities of the electrodes made from the carbon fiber fabrics of examples E1-E3 obtained from cyclic voltammetric analysis were listed in table 3. Each fabric of examples E1-E3 was cut into three electrodes and each electrode was analyzed individually. The result shown in table 3 is the mean value of the three repetitions.

TABLE 3

Cyclic Voltammetric Analysis

|  | Electrode Mass (mg) | Capacity (F) | Discharge Specific Capacity (F/g) |
|---|---|---|---|
| E1-1 | 10.41 | 1.965 | 189 |
| E1-2 | 8.67 | 1.733 | 200 |
| E1-3 | 8.27 | 1.308 | 158 |
| E1 (mean) |  |  | 182 |
| E2-1 | 13.35 | 3.245 | 243 |
| E2-2 | 14.44 | 4.563 | 316 |
| E2-3 | 9.75 | 2.552 | 262 |
| E2 (mean) |  |  | 274 |
| E3-1 | 2.89 | 0.957 | 331 |
| E3-2 | 9.4 | 2.548 | 271 |
| E3-3 | 2.91 | 0.755 | 259 |
| E3 (mean) |  |  | 287 |

As can be seen in table 3, the specific capacities of the electrodes made from the carbon fiber fabrics of the examples E1-E3 were 182 F/g, 274 F/g, and 287 F/g, respectively. The specific capacity measured by cyclic voltammetric analysis was similar to that measured by galvanostatic charge and discharge analysis. Thus, it's confirmed that the electrodes made from the E3 carbon fiber fabrics of the examples E1-E3 of the present invention had higher specific capacity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for manufacturing an electrode of a supercapacitor, comprising:
   providing a poly(acrylonitrile) fabric, the poly(acrylonitrile) fabric comprising a plurality of poly(acrylonitrile) fibers each having a diameter of about 50-500 nm;
   heat treating the poly(acrylonitrile) fabric to form a carbon fiber fabric comprising a plurality of carbon fibers each having a diameter of about 50-500 nm, wherein a surface of each of the carbon fibers has a plurality of nano pores of about 1-50 nm in diameter, and a total surface area of the nano pores accounts for about 85-95% of a total surface area of the carbon fibers; and
   cutting the carbon fiber fabric to acquire the electrode.

2. The method for manufacturing an electrode of a supercapacitor according to claim 1, wherein heat treating the poly(acrylonitrile) fabric comprises:
   heating the poly(acrylonitrile) fabric to a first heating temperature of about 200-300° C. and maintaining the first heating temperature for about 60-120 minutes to oxidize the poly(acrylonitrile) fabric; and
   heating the poly(acrylonitrile) fabric to a second heating temperature of about 800-1000° C. and maintaining the second heating temperature for about 3-9 minutes to form the carbon fiber fabric.

3. The method for manufacturing an electrode of a supercapacitor according to claim 1, wherein the poly(acrylonitrile) fibers are manufactured by an electrospinning technique.

4. The method for manufacturing an electrode of a supercapacitor according to claim 1, further comprising forming a metal current collector on the carbon fiber fabric.

5. The method for manufacturing an electrode of a supercapacitor according to claim 4, wherein the metal current collector is sputtered on a surface of the carbon fiber fabric.

6. An electrode of a supercapacitor, comprising a plurality of carbon fibers each having a diameter of about 50-500 nm, wherein a surface of each of the carbon fibers has a plurality of nano pores of about 1-50 nm in diameter, and a total surface area of the nano pores accounts for about 85-95% of a total surface area of the carbon fibers.

7. The electrode according to claim 6, further comprising a metal current collector disposed on the carbon fibers.

8. The electrode according to claim 7, wherein a material of the metal current collector is platinum, titanium, gold, silver, copper, aluminum, chromium, iron, or an alloy thereof.

* * * * *